United States Patent Office 2,772,514
Patented Dec. 4, 1956

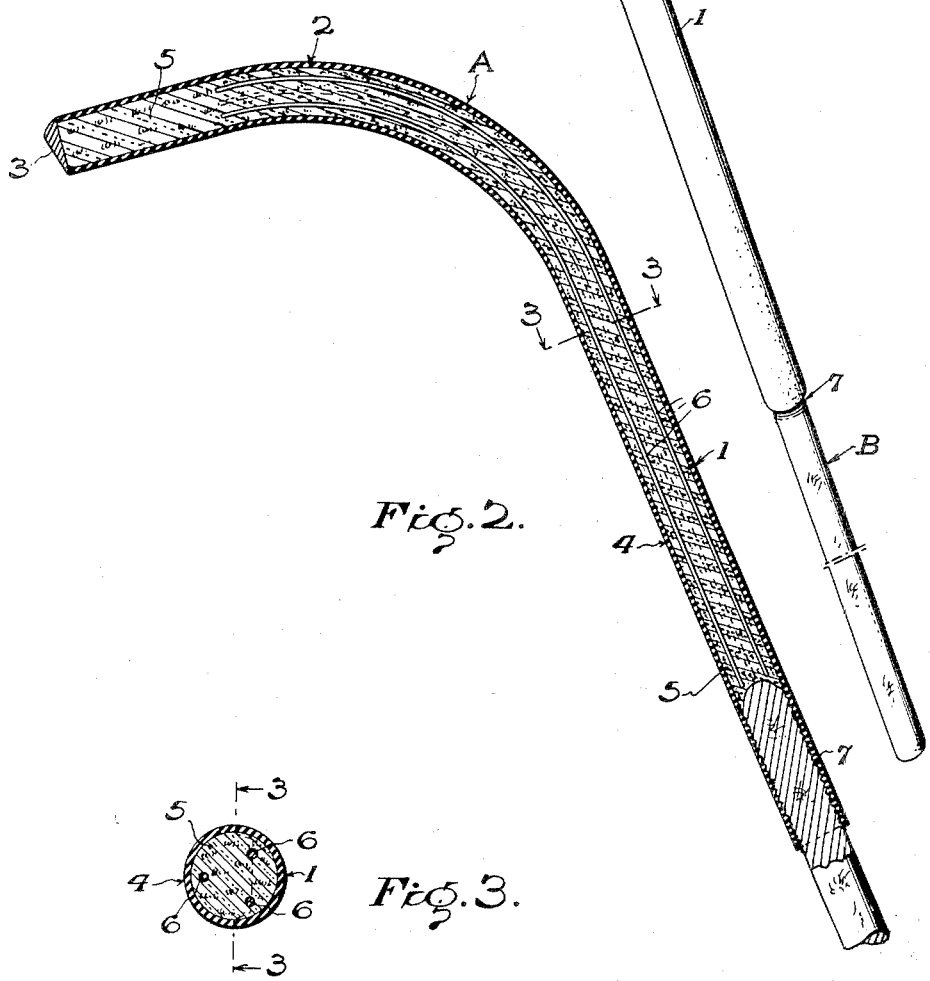

2,772,514

CLUSTER-BUSTER, FRUIT THINNING TOOL

Alvin R. Mangnall, Palisade, Colo.

Application May 20, 1954, Serial No. 431,245

4 Claims. (Cl. 47—1)

This invention relates to an improved fruit thinner for removing selected embryo fruit from a cluster.

In conducting orcharding operations it is desirable to remove particular fruit from a cluster in order to force the remaining fruit to grow larger for better marketing advantages. In some cases it has heretofore been the practice to shake or vibrate the entire tree or limb to remove some of the fruit, but this mass type of operation is neither conducive to accuracy nor efficiency.

Accordingly, the present invention has primarily in view a fruit thinning tool which may be used to selectively strike and dislodge particular fruits from their branch or limb by a short percussive stroke. This operation may be carried out by the user standing on the ground, except possibly where the height of the tree makes necessary the use of a handle that is too long so that is becomes awkward to manipulate.

Another object of the invention is to make a tool head which is flexible or resilient; provided with a relatively soft striking tip for engaging the fruit to be removed; and which will not bruise or otherwise injure the fruit selected to be left on the limb or branch.

With the above and other objects in view which will more readily appear as the nature of the invention is better understood, the same consists in the features hereinafter more fully described and claimed.

A preferred and practical embodiment of the invention is shown in the accompanying drawings, in which Fig. 1 is a perspective view of the complete tool, including a handle.

Fig. 2 is an enlarged transverse sectional view of the tool head.

Fig. 3 is a cross sectional view taken on the line 3—3 of Fig. 2.

Similar references designate corresponding parts in the several views.

As will be observed from the drawings, the tool includes a head designated generally as A and a handle B to facilitate its manipulation.

The head A preferably includes a shank portion 1 and an arcuate or curved portion or crook 2 with a relatively soft tip 3.

The body 1 includes an outer sheath or casing 4 made of flexible material, such for example as that used in making garden hose, and the said sheath covers and encases a core 5 of, for example, sponge rubber. The core 5 has embedded in the shank thereof and for a portion of the length of the head suitable reinforcement 6 in the form of rods or wires, such for example as a good grade of piano wire. These resilient wires assist in maintaining the crook portion or shape of the head after it has been molded into the form and shape described. At the same time these wires augment the flexibility and striking power of the head during its manipulation and add considerably to the longevity of the device so that it may be used again and again.

The tip 3 is preferably in the form of soft rubber with a soft striking face disposed at an angle to the end of the sheath 4 and core 5 as will be apparent from the drawings.

The end of the head A opposite the striking face 3 is provided with an interiorally threaded socket 7 for receiving the threads on the handle B. The threads of the socket may be formed during the process of molding the entire head.

As will be seen from the drawings, the reinforcing wires 6 terminate substantially at the inner end of the socket 7.

In use the tool including the handle B is manipulated by imparting short vibratory strokes developing sufficient force at the tip 3 to dislodge the fruit from its stem. By repeating this operation for different clusters, the undesired fruit may be removed with ease and facility to attain the objects set forth herein.

Without further description it is believed that the structure and operation of the tool will be readily apparent to those skilled in the art and it will, of course, be understood that changes may be resorted to within the scope of the appended claims.

I claim:

1. A fruit thinning tool for selectively removing embryo fruit from a cluster including a resilient head comprising an outer sheath of flexible material, a core of flexible material, metallic reinforcement in the core, and a soft fruit striking tip, said tip comprising a soft yieldable striking face.

2. A fruit thinning tool for selectively removing embryo fruit from a cluster including, a resilient head comprising an outer hollow sheath of rubber like material having a relatively straight shank portion for attachment at one end to a handle and having its other end curved to provide an offset terminal portion, a soft rubber fruit striking face mounted over the tip end of said terminal portion, a core of sponge rubber in the hollow sheath, and a plurality of longitudinally disposed spring wire elements embedded in the core.

3. A fruit thinning tool including, a handle, and a relatively stiff resilient head capable of being accurately guided and directed by manipulating said handle to strike a selected one of a group of embryo fruit, said head comprising, a crook portion having a fruit striking tip at the end of the crook portion opposite the handle and presenting a soft yieldable striking face to lessen the blow on the fruit to be removed, thereby avoiding a jarring force which would effect the dislodgement of the fruit to be retained on the tree.

4. The tool described in claim 3, wherein the crook portion is made of yieldable resilient shock absorbing material adapted to resiliently yield upon striking fruit or the like with the said tip.

References Cited in the file of this patent

UNITED STATES PATENTS

| 169,550 | Jones | Nov. 2, 1875 |
| 240,354 | Allen | Apr. 19, 1881 |
| 341,795 | Couse | May 11, 1886 |
| 448,650 | Grant | Mar. 24, 1891 |
| 934,674 | Lambert | Sept. 21, 1909 |
| 1,748,354 | Laing | Feb. 25, 1930 |
| 2,542,665 | Gustafson | Feb. 20, 1951 |
| 2,694,880 | Artese | Nov. 23, 1954 |

FOREIGN PATENTS

| 12,089 | Great Britain | of 1893 |